United States Patent Office 3,442,911
Patented May 6, 1969

3,442,911
GLYCYRRHETYL GLUCOSIDURONATES
Lily Baxendale, London, England, assignor to Biorex
Laboratories Limited, London, England
No Drawing. Filed May 31, 1967, Ser. No. 642,335
Claims priority, application Great Britain, May 31, 1966,
24,154/66
Int. Cl. C07d 7/18; C08b 19/00
U.S. Cl. 260—345.8          7 Claims

ABSTRACT OF THE DISCLOSURE

There are described new mono- and di-glucosiduronate derivatives of glycyrrhetinic acid in which the hydroxy groups in the glucosiduronate radical can also be acylated. The new compounds are pharmaceuticals possessing anti-inflammatory properties.

BACKGROUND OF THE INVENTION

Glycyrrhetinic acid per se and many of its derivatives are known to possess interesting and valuable pharmaceutical and therapeutic properties, especially anti-inflammatory properties.

It is also known that many naturally-occurring substances of medicinal interest and utility actually occur in the form of sugar derivatives, i.e. the so-called glycosides.

It is an object of the present invention to provide new derivatives of glycyrrhetinic acid which are also sugar derivatives.

SUMMARY OF THE INVENTION

The present invention is concerned with new derivatives of glycyrrhetinic acid and with the preparation thereof. The new derivatives of the present invention have been found to possess interesting and valuable pharmaceutical properties. These new derivatives are especially useful as anti-inflammatory agents. Such materials are employed in the manner hereinafter described.

The new glycyrrhetinic acid derivatives according to the present invention are compounds of the general formula:

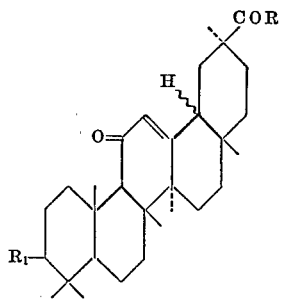

(I)

wherein R is a hydroxyl group, an alkoxy radical or a radical of the general formula:

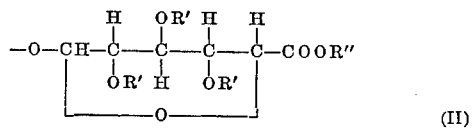

(II)

R' being a hydrogen atom or an acyl radical and R" being a hydrogen atom or an alkyl radical, and $R_1$ represents a ketonic oxygen atom, a hydroxyl group, an acyloxy radical, a carboxy-acyloxy radical, an alkoxycarbonyl-acyloxy radical or a carbonyl-acyloxy radical, the carbonyl group of which is attached to a radical (II), with the proviso that the compounds (I) contain at least one radical (II).

DETAILED DESCRIPTION OF THE INVENTION

In the above-given general Formulae I and II, the alkoxy radicals R preferably contain up to 6 carbon atoms and may be straight-chained or branched, the acyl radicals R' preferably contain up to 3 carbon atoms and the acyloxy radical $R_1$ preferably contains up to 6 carbon atoms.

As examples of alkoxy radicals R there may be mentioned methoxy, ethoxy, isopropoxy and tert-butoxy radicals; as examples of acyl radicals R', there may be mentioned acetyl and propionyl radicals; and as examples of the acyl portion of the radical $R_1$, there may be mentioned actyl, propionyl, n-butanoyl and iso-pentanoyl radicals.

The new compounds according to the present invention can be prepared by reacting a compound of the general formula:

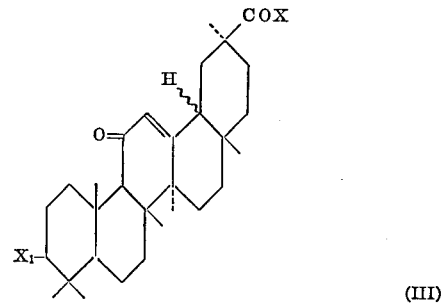

(III)

wherein X is a hydroxyl group or an alkoxy radical and $X_1$ is a ketonic oxygen atom, a hydroxyl group, an acyloxy radical, a carboxy-acyloxy radical or an alkoxycarbonyl-acyloxy radical, with the proviso that the compound (III) contains at least one carboxylic acid group, with an alkyl ester of a tri-O-acyl-α-D-glucopyranosyl bromide uronic acid.

If desired, the products so obtained can be hydrolysed to split off some or all of the acyl groups in the glucuronosyl side chain and also to liberate the carboxylic acid group in the glucuronosyl side chain. Due to the fact that the glycosidic linkage is also very easily hydrolysed, it was found that the best method of removing the acyl groups and of hydrolysing the esterified carboxylic acid group in the glucuronosyl side chain was by means of a methanolic solution of trimethylamine.

The glucuronosyl compound used as starting materials are either known compounds or can be prepared by known methods (c.f. Bollenback et al., J.A.C.S., 77, 3310/1955). The reaction is preferably carried out in the presence of silver oxide, using quinoline as a catalyst (c.f. Anderson, Clin, Chim. Acta, 12, 669–70/1965).

The following examples are given for the purpose of illustrating the present invention:

EXAMPLE 1

Methyl 18β-glycyrrhetyl-30-(2,3,4-tri-O-acetyl-β-glucosiduronate 3.97 g. (10 mM.) methyl 2,3,4-tri-O-acetyl-1-bromo-α-D-glucopyranuronate, 2.355 g. (5 mM.) 18β-glycyrrhetinic acid and 5 ml. quinoline were ground together at room temperature. Some heat was generated and the mixture became almost solid. 2.32 g. freshly-prepared silver oxide (c.f. Org. Synth., Coll. vol. 2, p. 12) were added gradually and mixing continued for a further 20 minutes. The resulting dark brown material was left in a vacuum desiccator over the weekend. It was then extracted with chloroform and filtered. The dark coloured filtrate was washed twice with equal volumes of 1N sulphuric acid and 1N sodium hydroxide solution and finally with water. On the first addition of sodium hydroxide solution, a bulky precipitate was formed, which was filtered off. This proved, on chromatographic analysis, to be largely the sodium salt of glycyrrhetinic acid.

The chloroform extract was then dried overnight with anhydrous sodium sulphate. After filtering off the sodium sulphate, the chloroform was removed in a rotary evaporator and the residual redish syrup dissolved in 100 ml. ethanol and left in a refrigerator to crystallise. 1.287 g. of slightly coloured crystals were obtained which had a melting point of 235–240° C. The material was taken up in ethanol, treated with a little charcoal and filtered. After recrystallisation from ethanol, there were obtained 1.111 g. of white crystals with a melting point of 242–243° C.; $[\alpha]_D^{-20} = +105 \pm 1°$ (c.=1% in chloroform).

The product, which was chromato-graphically homogenous, was methyl 18$\beta$-glycyrrhetyl-30-(2,3,4-tri-O-acetyl)-$\beta$-glucosiduronate. $R_F$ 0.78–0.87 in i-butanol-acetic acid-water (4:1:2) on Merck silica gel HF$_{254}$. The spot was stained slowly to a brownish colour with naphtho-resorcinol reagent at 120° C. The compound reduced Fehling's solution when dissolved in methanol. Ether glucuronides do not reduce under such conditions, whereas ester glucuronides, even when in the form of tri-O-acetyl derivatives, do reduce. Further evidence that the product was an ester glucuronide and not an ether glucuronide was the fact that the infrared spectrum shewed a sharp absorption band at 3500$^{-1}$ which is characteristic of the free 3-hydroxyl group of glycyrrhetinic acid.

EXAMPLE 2

Methyl 18$\beta$-glycyrrhetyl-30-(2,3,4-tri-O-acetyl)-$\beta$-glucosiduronate 4.7 g. (10 mM.) 18$\beta$-glycyrrhetinic acid and 8.7 g. (22 mM.) methyl 2,3,4-tri-O-acetyl-1-bromo-$\alpha$-D-glucopyranuronate were added to 10 ml. redistilled quinoline. The temperature of the semi-solid mixture rose to 35° C. 4.65 g. freshly prepared silver oxide were added, with stirring, in the course of 20 minutes, during which the reaction mixture became more liquid and the temperature rose to 40° C. The resultant dark brown mixture was left in a desiccator for 2 days and then extracted with 250 ml. chloroform. The chloroform extract was filtered, washed twice with 250 ml. 1 N sulphuric acid, again washed twice with 250 ml. water, dried over anhydrous sodium sulphate and the solvent removed in vacuo. The residual red syrup was taken up in 200 ml. ethanol and left to crystallise at 0° C. There were obtained 5.0 g. (equivalent to a 65% yield based on the amount of glycyrrhetinic acid used) of methyl 18$\beta$-glycyrrhetyl-30-(2,3,4-tri-O-acetyl)-$\beta$-glucosiduronate which was repeatedly recrystallised from ethanol combined with charcoal clarification, to give colourless needles with a melting point of 240–242° C.; $[\alpha]_D = +105°$. The infrared spectrum shewed a sharp absorption band at 3450 cm.$^{-1}$(3-hydroxyl group) and at 890 cm.$^{-1}$ (assigned to the $\beta$-anomer; c.f. Pravidic and Keglivić, J.C.S., 1964, 4633).

Analysis.—C$_{43}$H$_{62}$O$_{13}$(M.W. 786.97). Calcd: C, 65.6%; H, 7.9%. Found: C, 65.5%; H, 7.7%.

EXAMPLE 3

Methyl 3-keto-18$\beta$-glycyrrhetyl-30-(2,3,4-tri-O-acetyl)-$\beta$-glucosiduronate 0.47 g. (1mM.) 3-keto-18$\beta$-glycyrrhetinic acid and 0.44 g. (1.1 mM.) methyl 2,3,4-tri-O-acetyl-1-bromo-$\alpha$-D-glucopyranuronate were added to 1 ml. quinoline, followed by the addition of 0.23 g. silver oxide. The reaction and subsequent working up were carried out in a manner described in Example 2. There were obtained 0.52 g. (equivalent to a 68% yield based on the amount of 3-keto-glycyrrhetinic acid used) of methyl 3-keto-18$\beta$-glycyrrhetyl 30-(2,3,4-tri-O-ocetyl)-$\beta$-glucosiduronate which, after recrystallisation from ethanol, was obtained in the form of colourless needles with a melting point of 153–155° C.; $[\alpha]_D = +20°$. The compound, when dissolved in ethanol, reduced Fehling's solution. The infrared spectrum shewed a sharp absorption band at 890 cm.$^{-1}$ ($\beta$-anomer).

Analysis.—C$_{43}$H$_{60}$O$_{13}$ (M.W. 784.95). Calcd: C, 65.8%; H, 7.7%. Found: C, 66.2%; H, 8.1%.

EXAMPLE 4

Methyl 3-O-acetyl-18$\beta$-glycyrrhetyl-30-(2,3,4-tri-O-acetyl)-$\beta$-glucosiduronate (a) 0.51 g. (1 mM.) 3-O-acetyl-18$\beta$-glycyrrhetinic acid and 0.44 g. (1.1 mM.) methyl 2,3,4-tri-O-acetyl-1-bromo-$\alpha$-D-glucopyranuronate were added to 1 ml. quinoline, followed by the addition of 0.23 g. silver oxide. The reaction and subsequent working up were carried out in the manner described in Example 2. There were obtained 0.41 g. (equivalent to a 54% yield based on the amount of 3-O-acetyl-18$\beta$-glycyrrhetinic acid used) of methyl 3-O-acetyl-18$\beta$-glycyrrhetyl-30-(2,3,4-tri-O-acetyl) - $\beta$ - glucosiduronate which, after recrystallisation from ethanol, were obtained in the form of colourless needles, with a melting point of 295–300° C. (decomp.). The compound, which dissolved in ethanol, reduced Fehling's solution. The infrared spectrum shewed a sharp absorption band at 890 cm.$^{-1}$. ($\beta$-anomer).

Analysis.—C$_{43}$H$_{64}$O$_{14}$ (M.W. 804.98). Calcd: C, 65.2%; H, 7.8%. Found: C, 59.5%; H. 7.4%.

(b) 82 mg. methyl 18$\beta$-glycyrrhetyl-30-(2,3,4-tri-O-acetyl)-$\beta$-glucosiduronate (prepared in the manner described in Example 2) in 1 ml. pyridine were mixed with 0.2 ml. acetic anhydride and left to stand overnight. 10 ml. ether were then added and the solvents removed with a current of cold air. This procedure was repeated twice. There were obtained 85 mg. of products, the melting point and mixed melting point of which shewed it to be identical with the product of Example 4(a). The infrared-spectrum shewed the absence of the peak at 3450 cm.$^{-1}$ which is attributed to the 3-hydroxyl group of glycyrrhetinic acid.

EXAMPLE 5

Methyl 3-O-(3'-carboxy-propionyl)18$\beta$-glycyrrhetyl-4',30-bis-(2,3,4-tri-O-acetyl)-$\beta$-glucosiduronate 5.7 g. (10 mM.) 3-O-(3'-carboxy-propionyl)-18$\beta$-glycyrrhetinic acid and 8.7 g. (22 mM.) methyl 2,3,4-tri-O-acetyl-1-bromo-$\alpha$-D-glucopyranuronate were added to 10 ml. quinoline, followed by the addition of 4.65 g. silver oxide. The reaction and subsequent working up were carried out in the manner described in Example 2. There were obtained 4.1 g. (equivalent to a 35% yield based on the amount of 3-O-(3'-carboxy-propionyl)-18$\beta$-glycyrrhetinic used) of methyl 3-O-(3'-carboxy propionyl)-18$\beta$-glycyrrhetyl-4',30-bis-(2,3,4-tri-O-acetyl)-$\beta$ - glucosiduronate which, after recrystallisation from ethanol, was obtained in the form of colourless needles with a melting point of 137–139° C.; $[\alpha]_D = +46°$. The compound, when dissolved in ethanol, reduced Fehling's solution. The infrared spectrum shewed a sharp absorption band at 890 cm.$^{-1}$ ($\beta$-anomer).

Analysis.—C$_{60}$H$_{82}$O$_{25}$ (M.W. 1203.32). Calcd: C, 59.9%; H, 6.9%. Found: C, 59.3%; H, 7.1%.

EXAMPLE 6

Dimethyl 3-O-(3'-carboxyl-propionyl)18$\beta$-glycyrrhetyl-4'-(2,3,4-tri-O-acetyl)-$\beta$-glucosiduronate 0.29 g. (0.5 mM.) methyl 3-O-(3'-carboxy-propionyl)-18$\beta$-glycyrrhetinate and 0.22 g. (0.55 mM.) methyl 2,3,4-tri-O-acetyl-1-bromo-$\alpha$-D-glycopyranuronate were added to 0.5 ml. quinoline, followed by 0.12 g. silver oxide. The reaction and subsequent working up were carried out in the manner described in Example 2. There were obtained 0.24 g. (equivalent to a 54% yield based on the amount of methyl 3-O-(3'-carboxy-propionyl)-18$\beta$-glycyrrhetinate used) of di-methyl 3-O-(3'-carboxy-propionyl)-18$\beta$-glycyrrhetyl-4'-(2,3,4-tri-O-acetyl) - $\beta$ - glucosiduronate which, after recrystallisation from ethanol, was obtained in the form of colourless needles with a melting point of 198–200° C.; [α]$_D$=+85. The compound, when dissolved in ethanol, reduced Fehling's solution. The infrared spectrum shewed an absorption band at 890 cm.$^{-1}$ (β-anomer).

Analysis.—C$_{48}$H$_{68}$O$_{16}$ (M.W. 901.07). Calcd: C, 64.0%; H, 7.6%. Found: C, 64.0%; H, 7.6%.

EXAMPLE 7

Methyl 3-O-(3′-methoxycarbonyl-propionyl)-18β-glycyrrhetyl-30-(2,3,4-tri-O-acetyl)-β-glucosiduronate 3.5 g. (6 mM.) 3-O-(3′-methoxycarbonyl-propionyl)-18β-glycyrrhetinic acid and 2.6 g. (6.6 mM.) methyl 2,3,4-tri-O-acetyl-1-bromo-α-D-glycopyranuronate were added to 6 ml. quinoline, followed by the addition of 2.2 g. silver oxide. The reaction and subsequent working up were carried out in the manner described in Example 2. There were obtained 2.9 g. (equivalent to a yield of 54% based on the amount of 3-O-(3′-methoxycarbonyl-propionyl)-18β-glycyrrhetinic acid used) of methyl 3-O-(3′-methoxycarbonyl-propionyl)-18β-glycyrrhetyl - 30 - (2,3,4-tri-O-acetyl)-β-glucosiduronate which, after recrystallisation from ethanol, was obtained in the form of colourless needles with a melting point of 246–247° C; [α]$_D$=+91°. The compound, when dissolved in ethanol, reduced Fehling's solution. The infrared spectrum shewed an absorption band at 890 cm.$^{-1}$ (β-anomer).

Analysis.—C$_{48}$H$_{68}$O$_{16}$ (M.W. 901.07). Calcd: C, 64.0%; H, 7.6%. Found: C, 63.7%; H, 8.0%.

The triacetylated compounds described in the above examples were converted into the corresponding acetyl group-free compounds by hydrolysing with 1 N methanolic solution of trimethylamine for 2 days at 5° C., followed by chromatographic separation of the hydrolysis product.

The present invention further includes within its scope pharmaceutical compositions which comprise one or more of the new compounds according to the present invention with a significant amount of a pharmaceutical carrier. The invention includes especially such compositions made up for oral, rectal or parenteral administration.

Solid compositions for oral administration include compressed tablets, pills, dispersible powders and granules. In such solid compositions, one or more of the new compounds according to the present invention is or are admixed with at least one inert diluent, such as calcium carbonate, potato starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also contain adjuvants, such as wetting and suspending agents, and sweetening and flavouring agents.

The compositions according to the present invention for oral administration include capsules of absorbable material, such as gelatine, containing one or more of the new active compounds according to the present invention, with or without the addition of diluents or excipients.

Preparations according to the present invention for parenteral administration include sterile aqueous or non-aqueous solutions, suspensions and emulsions. Examples of non-aqueous solvents or suspending media are propylene glycol, polyethylene glycol, vegetable oils, such as olive oil, and injectable organic esters, such as ethyl oleate. These compositions may also contain adjuvants, such as wetting, emulsifying and dispersing agents. They may be sterilised by, for example, filtration through a bacteria-retaining filter, by incorporation in the compositions of sterilising agents, by irradiation or by heating. They may also be produced in the form of sterile solid compositions, which can be dissolved in sterile water or some other sterile injectable medium immediately before use.

The percentage of active ingredients in the compositions according to the present invention may be varied, it being necessary that it should constitute a proportion such that a suitable dosage for the therapeutic effect desired shall be obtained. Obviously, several unit dosage forms may be administered at about the same time. The preparations according to the present invention should normally be administered so as to give, in the case of oral administration, 50–1000 mg. of active substance per day and, in the case of parenteral administration, 50–600 mg. of active substance per day.

The following example illustrates a pharmaceutical composition according to the present invention:

EXAMPLE 4

250 m. tablets are prepared containing:

| | Mg. |
|---|---|
| Starch | 120 |
| Magnesium stearate | 5 |
| Lactose | 25 |
| Methyl 18β - glycyrrhetyl - 30 - (2,3,4 - tri-O-acetyl)-β-glucosiduronate | 100 |

I claim:
1. A compound of the general formula:

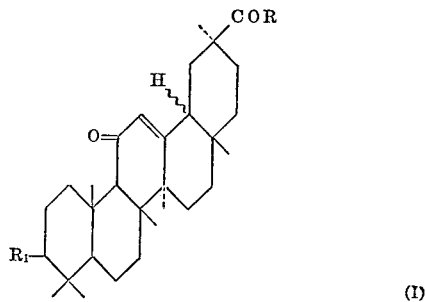

(I)

wherein R is a member selected from the group consisting of a hydroxyl group, alkoxy radicals containing up to 6 carbon atoms and a radical of the formula

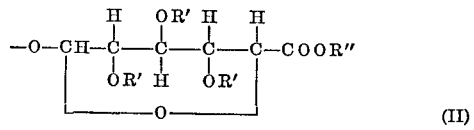

(II)

R′ being a member selected from the group consisting of hydrogen atoms and acyl radicals containing up to 3 carbon atoms and R″ being a member selected from the group consisting of hydrogen atoms and lower alkyl radicals, and R$_1$ represents a member selected from the group consisting of ketonic oxygen atoms, hydroxyl groups, acyloxy radicals containing up to 6 carbon atoms, carboxy-acyloxy radicals containing up to 6 carbon atoms in the acyloxy group, alkoxy carbonyl-acyloxy radicals containing up to 6 carbon atoms in each of the alkoxy group and the acyloxy group and carbonyl-acyloxy radicals containing up to 6 carbon atoms in the acyloxy group, the carbonyl group of which is attached to a radical (II), with the proviso that the compound (I) contains at least one radical (II).

2. Methyl 18β - glycyrrhetyl - 30 - (2,3,4-tri-O-acetyl)-β-glucosiduronate.

3. Methyl 3 - keto - 18β - glycyrrhetyl - 30 - (2,3,4-tri-O-acetyl)-β-glucosiduronate.

4. Methyl 3 - O - acetyl - 18β - glycyrrhetyl - 30 - (2,3,4-tri-O-acetyl)-β-glycosiduronate.

5. Methyl 3-O-(3' - carboxy-propionyl)-18β-glycyrrhetyl-4',30-bis-(2,3,4-tri-O-acetyl)-β-glycosiduronate.

6. Dimethyl 3 - O - (3' - carboxy-propionyl - 18β-glycyrrhetyl-4'-(2,3,4-tri-O-acetyl)-β-glucosiduronate.

7. Methyl 3 - O - (3' - methoxycarbonyl-propionyl)-18β - glycyrrhetyl - 30 - (2,3,4 - tri - O - acetyl) - β-glycosiduronate.

References Cited

UNITED STATES PATENTS 3,066,072  11/1962  Gottfried et al. _____ 260—210

LEWIS GOTTS, *Primary Examiner.*

J. R. BROWN, *Assistant Examiner.*

U.S. Cl. X.R.

260—210, 345.7; 424—283